United States Patent [19]

Belter

[11] 3,957,279

[45] May 18, 1976

[54] COMPOSITE GASKET ASSEMBLY FOR AN ENGINE

[75] Inventor: Jerome G. Belter, Mount Prospect, Ill.

[73] Assignee: Dana Corporation, Toledo, Ohio

[22] Filed: Mar. 28, 1975

[21] Appl. No.: 563,033

[52] U.S. Cl. .......................................... 277/235 B
[51] Int. Cl.² ........................................ F16J 15/12
[58] Field of Search ................ 277/235 B, 235, 166

[56] References Cited
UNITED STATES PATENTS

| | | | |
|---|---|---|---|
| 2,024,369 | 12/1935 | Kaiser | 277/235 B |
| 2,152,630 | 4/1939 | Balfe | 277/235 B |

Primary Examiner—Robert I. Smith
Attorney, Agent, or Firm—Robert E. Pollock

[57] ABSTRACT

Disclosed is a gasket assembly for sealing between the intake ports of cylinder heads and both sides of the intake manifold assembly in a V-type internal combustion engine. It is an integral, yet remote, part of a formed metal component that primarily acts as a cover between the two banks of the cylinder block of a V-type engine. The metal component is formed as a generally rectangularshaped pan with the gasket portion extending angularly outward and upward along both sides of the assembly.

The gasket assembly is a combination of the extended metal component to one or both sides of which is attached a relatively soft gasketing material such as rubber, cork, asbestos or other fiberous composition materials. The gasket assembly is designed and constructed to make contact with, and provide a seal between both cylinder heads and the intake manifold of a V-type engine. The gasket assembly includes apertures and a plurality of relatively small discretely perforated areas in the corresponding extended metal portion. The perforated areas are preferably remote from the apertures and serve to mechanically attach the gasket materials and the metal together. The metal component is embossed around the apertures prior to assembly, to provide an increase in sealing stress at these locations.

6 Claims, 8 Drawing Figures

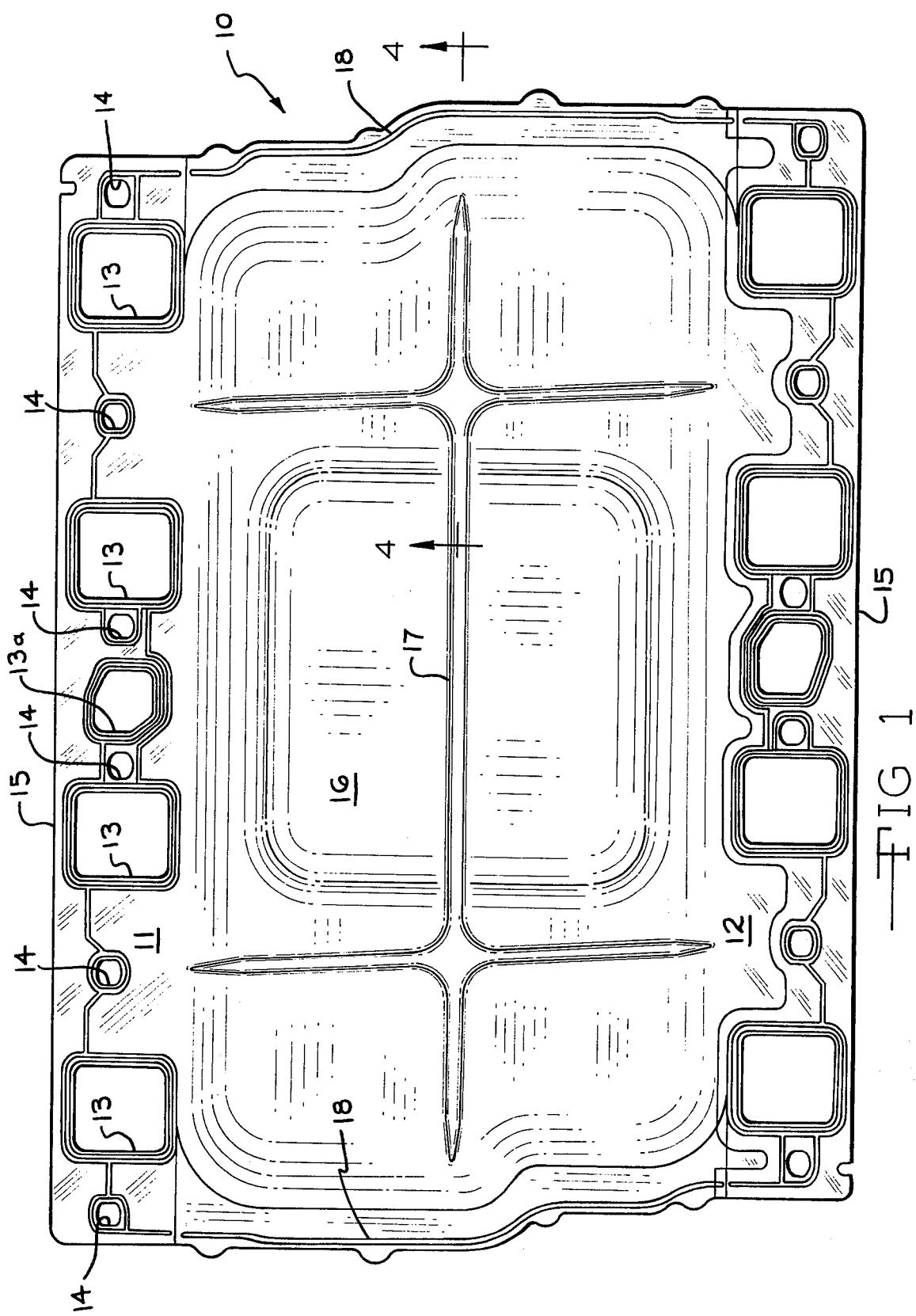

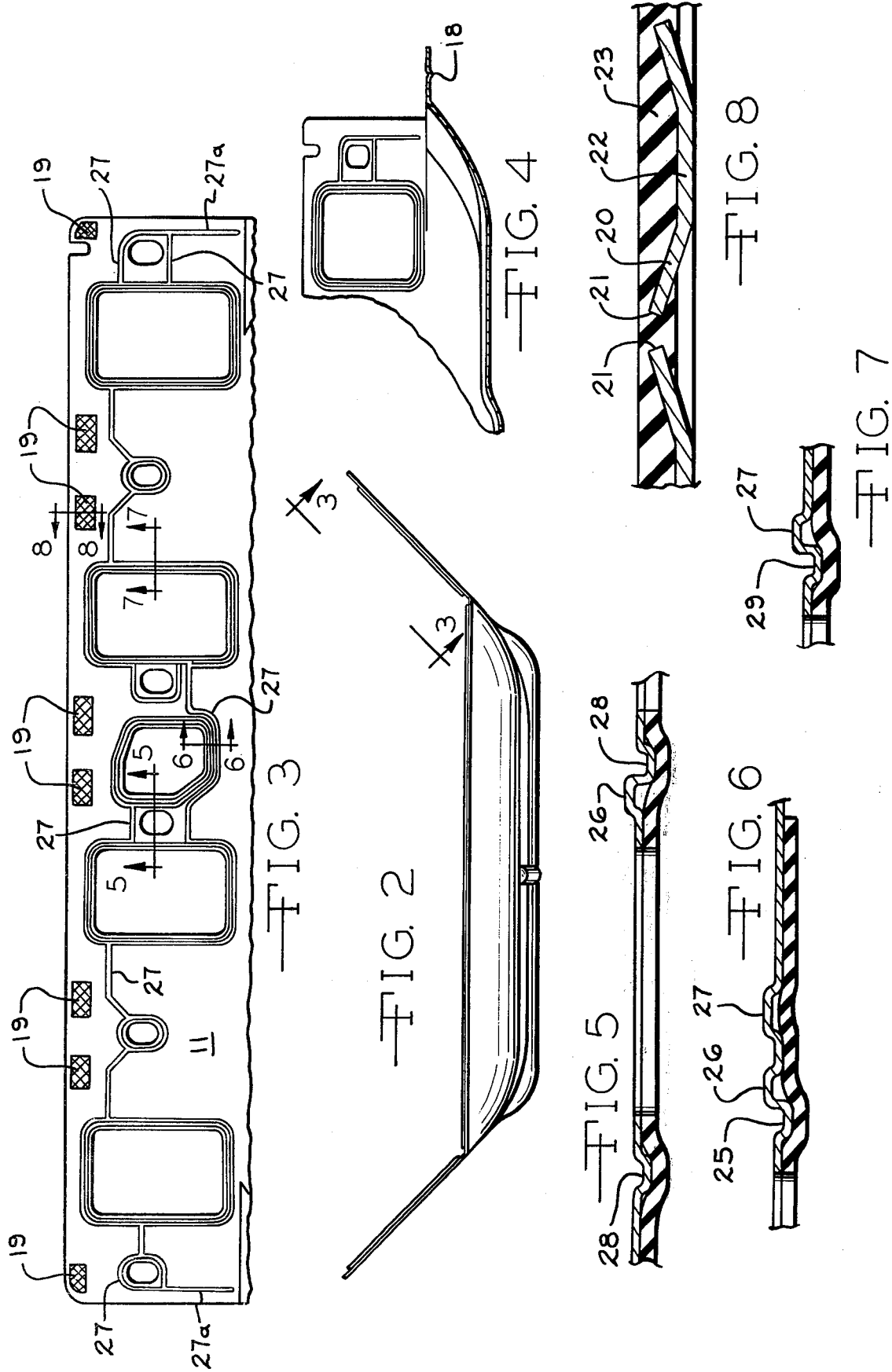

COMPOSITE GASKET ASSEMBLY FOR AN ENGINE

BACKGROUND OF THE INVENTION

The invention relates to gaskets and more particularly to composite gaskets of metal and a relatively compressible material.

A wide variety of sheet gasket materials have been used for internal combustion engines and the like in the past. Such gaskets have been made of metal, of relatively compressible materials such as sheets of cork, rubber, asbestos, or the like or of composites thereof.

Composite gaskets of metal and compressible materials have generally been formed by clinching substantially the entire abutting surfaces of the layers together or by joining such surfaces with adhesives. The former construction is exemplified by U.S. Pat. No. 3,532,349 to D. E. Czernik and commonly assigned herewith. Other such constructions are shown in U.S. Pat. Nos. 2,720,406 and 2,152,630. While such constructions are desirable in many applications they are not readily adaptable to gaskets wherein the compressible material is not coextensive with the metal core and/or wherein the metal core is not essentially planar.

Adhesively secured composite gaskets are not entirely satisfactory because of the operations required to assemble them, the frequent substantial drying and curing time of the adhesives and the resulting handling problems and the tendency of many adhesives to release in storage at elevated temperatures and/or under high humidity conditions.

One type of composite gasket with which the foregoing difficulties have been particularly evident is the one-piece cylinder head gasket for both banks of cylinders in a "V" block engine as generally shown in U.S. Pat. No. 3,001,518. As will be appreciated, the use of a metal body with a compressible facing adhesively secured thereon in the sealing areas would involve several manufacturing difficulties. For example, stacking of the assembled gaskets prior to the complete drying of the adhesive tends to cause the compressible facing to slip from its initial location.

Accordingly it is an object of the present invention to provide an improved composite gasket structure using secured superimposed layers of metal and compressible materials.

It is a further object of the invention to provide such a structure which is satisfactory for use in an one-piece intake manifold gasket for both banks of cylinders in a "V" block engine.

It is still another object of the invention to provide such a gasket which is easy to assemble and not adversely affected by normal maufacturing, storage and handling methods.

SUMMARY OF THE INVENTION

These and other objects are provided by a composite gasket including a selectively perforated metallic core and a relatively compressible gasketing material superimposed on and mechanically attached to selected portions thereof. A plurality of registered openings are provided in both the core or formed pan component and the compressible gasketing material. The core includes at least one and preferably a plurality of ridges thereon on the face thereof adjacent the compressible material, closely adjacent the openings and extending completely around the same. The ridges provide a particularly good seal in the area of the openings where the sealing requirements are greatest.

The layers of the gasket are secured together by a plurality of small, discrete areas of tangs formed by perforating the metallic sheet. These tangs are used to clinch the relatively compressible layer to the metallic component and are preferably located away from the openings and ridges. The clinching tangs thus positively unite the two portions of the gasket while being so sized and located that they do not affect the quality of the primary seal provided by the soft gasket material and the ridges in the area of the latter.

BRIEF DESCRIPTION OF THE DRAWINGS

While the specification concludes with claims particularly and distinctly describing the invention it is believed that the same will be better understood with reference to the following description taken in conjunction with the accompanying claims in which:

FIG. 1 is a plan view of the metallic core or formed metallic component for one embodiment of the present invention;

FIG. 2 is an elevational view of the core or formed metallic component FIG. 1;

FIG. 3 is a partial view of the core or metallic component of FIG. 2 taken in the direction of line 3—3 thereon; and showing the preferred location of the clinching tangs thereon;

FIG. 4 is a fragmentary cross-sectional view of the core of FIG. 1 taken along line 4—4 thereon; and FIGS. 5–8 are fragmentary cross-sectional views of the core of FIG. 3, but including the soft gasket material, taken in the direction of the like-numbered lines of FIG. 3

DESCRIPTION OF THE PREFERRED EMBODIMENT

FIG. 1 of the drawings illustrates the formed metallic pan component, referred to hereinafter as the core, for a gasket assembly of the present invention in a preferred embodiment as an one-piece composite gasket for a "V" block engine and more specifically for a "V-8" engine. The core, designated generally by the numeral 10, includes two opposed longitudinal sections 11 and 12 adapted to be clampingly and sealingly engaged between the two sides of the intake manifold and the corresponding portions of the cylinder heads. In general the two sections 11 and 12 will be substantially similar and only one side will therefore be described in detail.

Section 11 includes a plurality of apertures 13 sized and arranged to provide passageways from the intake manifold to the various ports in the cylinder head. An aperture 13a is provided on each section 11 to provide a passageway through the gasket for registery with the conventional exhaust crossover conduits. Apertures 14 are provided for the bolts used to connect the manifold to the cylinder head.

Ridges, as will hereinafter more fully be described are provided on the metallic core around each aperture and preferably bridging therebetween to provide a continuous seal in the direction of the lateral edges 15 of the gasket.

A central portion 16 of the metallic body spans between the two sealing portions 11 and 12 and, in use, covers the central portion of the upper surface of the engine block. The size and shape of the portion 16 will, of course, depend on the design of the engine. Typically, the portion 16 is not coplanar with the sections 11 and 12 to which the compressible layer is applied, thereby increasing the difficulties in assembling the overall gasket. Preferably, the central portion includes a stiffening means such as that provided by the stamped transverse and longitudinal ribs 17. A transverse sealing rib 18 is preferably provided at the longitudinal extremities of the central portion 16. This rib 18 further stiffens the assembly and also provides a seal between the intake manifold and the engine block between the two cylinder heads.

The sealing section 11 of the metallic core 10 is shown in more detail (as seen looking in a direction normal thereto) in FIG. 3. This view also indicated the locations 19 preferred for the clinch tange 20 (as seen in FIG. 8). Preferably the tangs 20 are in pairs with their adjacent distal ends 21 in face to face relationship and are stamped from the core 10 by suitable die means well known in the art. Each tang 20 is generally rectangular in plan view and about 0.040 inch wide and 0.060 inch long. Adjacent longitudinally aligned pairs of tangs 20 are spaced from one another by a flat area 22 of about 0.125 inch. The transversely adjacent rows of tangs are staggered and separated by about 0.040 inch. The tangs 20 are initially formed at an angle of approximately 80°–90° with respect to the adjacent portion of the metallic core 10 and when the relatively compressible gasket material 23 is pressed thereon the tangs are bent to a final angle of approximately 15°–40° thereby clinching the layers together.

The tangs are located in a plurality of small discrete areas 19, which are generally remote from the critical seal areas in the regions of the apertures and adjacent ribs and are preferably located along the outer marginal edges of the sealing sections 11 and 12. Typically the areas 19 will be from about ¼ inch to 1 inch on a side. Such an arrangement of tangs provides a sufficient clinching force to secure the gasket together while not interferring with the seal.

A raised bead or rib is provided on the metal core 10, on the side thereof adjacent the relatively compressible gasket material 22, surrounding and closely adjacent each aperture. Such a rib is most readily and therefore preferably formed by stamping the core 10. A stamped bead is also advantageous in providing at least limited yieldability and conformability. Other rib or bead providing means, for example an annular grommet sandwiched between the core 10 and material 23, while less preferred can also be employed.

A variety of configurations for the stamped rib can be used depending on the function and service which each is to provide. Several such rib configurations are shown in FIGS. 5–7. Where space configurations permit, the rib configuration shown in FIG. 6 is preferred. In the configuration shown, such a rib arrangement is associated with the exhaust crossover apertures 13a where, because of temperature and pressure considerations such a seal is particularly preferred. The preferred rib arrangement of FIG. 6 comprises a first rib 25 which extends from the plane of the surrounding metallic sections, is convex toward the soft gasket material 23 and is continuous about and closely spaced from the aperture 13a. The second rib 26 is closely spaced outwardly from the rib 25, is continuous thereabout and is convexly extending away from the gasket material 23 and the plane of the surrounding metallic sections.

The third rib 27 associated with aperture 13a is not specific thereto, but rather is part of a single rib which is convex from the soft gasket material and the surrounding metallic sections and which spans substantially the entire longitudinal extent of the assembly. The rib 27 surrounds each of the bolt openings 14 and includes a transversely extending inwardly directed portion 27a at each end thereof.

As shown in FIGS. 5 and 7 the minimum bead configuration about the apertures 13 is a single convex bead, 28 and 29 respectively generally corresponding to the aforementioned bead 25.

The soft gasket 23 is substantially coextensive with the metallic sections 11 and includes corresponding apertures therein. The combination of the overall metallic structure, the beads thereon, the soft gasket 23 and the clinching tangs 20 joining the components together while not interferring with the seal at the critical areas surrounding the apertures 13 and 14 provided on improved gasket structures. The soft gasketing material can also be applied to both surfaces of the core member in the same manner as described if desired in any particular application.

Many variations will be apparent within the spirit and scope of the foregoing description.

What is claimed is:
1. A composite gasket assembly comprising a metallic body including a generally planar portion having a first and second sides, a plurality of apertures in said body, first ribs on said body surrounding and closely spaced from at least some of said apertures and convex with respect to said first side and a layer of relatively soft gasket material on said first side, second ribs on said body surrounding and closely spaced from at least some of said first ribs said second ribs being convex with respect to said second side of said body, a plurality of tangs formed in said body said tangs being only in areas thereof remote from said apertures, said tangs being clinched into said soft gasket material thereby securing the same to said body.

2. The gasket assembly of claim 1 including at least one additional rib on said body and convex with respect to said second side, said last mentioned rib extending substantially the full longitudinal extent of said assembly.

3. The gasket assembly of claim 1 wherein said tangs are at an angle of from about 15° to about 40° with respect to said planar portion.

4. The gasket of claim 3 including at least one additional rib on said body and convex with respect to said second side, said last mentioned rib extending substantially the full longitudinal extent of said assembly.

5. The gasket assembly of claim 2 wherein said additional rib surrounds at least some of said apertures.

6. The gasket assembly of claim 4 wherein said additional rib surrounds at least some of said apertures.

* * * * *